(12) United States Patent
Kurashige et al.

(10) Patent No.: US 7,282,161 B2
(45) Date of Patent: Oct. 16, 2007

(54) INORGANIC SCINTILLATOR

(75) Inventors: Kazuhisa Kurashige, Hitachinaka (JP); Hiroyuki Ishibashi, Tsukuba (JP); Keiji Sumiya, Tsukuba (JP); Nachimuthu Senguttuvan, Tsukuba (JP); Kazuhiro Yoshida, Hitachi (JP); Naoaki Shimura, Hitachinaka (JP)

(73) Assignee: Hitachi Chemical Co., Ltd., Tokyo (JP)

( * ) Notice: Subject to any disclaimer, the term of this patent is extended or adjusted under 35 U.S.C. 154(b) by 244 days.

(21) Appl. No.: 11/037,250

(22) Filed: Jan. 19, 2005

(65) Prior Publication Data

US 2005/0173676 A1  Aug. 11, 2005

(30) Foreign Application Priority Data

Jan. 20, 2004 (JP) ............................ P2004-012175

(51) Int. Cl.
  *C09K 11/79* (2006.01)
(52) U.S. Cl. ................. 252/301.4 F; 117/942
(58) Field of Classification Search ......... 117/942, 117/937; 252/301.4 F, 301.4 R
  See application file for complete search history.

(56) References Cited

U.S. PATENT DOCUMENTS 5,213,712 A * 5/1993 Dole .................... 252/301.4 R
6,278,832 B1 * 8/2001 Zagumennyi et al. ....... 385/141
2003/0159643 A1 * 8/2003 Sumiya et al. ............... 117/3

FOREIGN PATENT DOCUMENTS

| EP | 1 004 899 A1 | 5/2000 |
|---|---|---|
| JP | 58-138774 | 8/1983 |
| JP | 64-65481 | 3/1989 |
| JP | 2003-300795 | * 10/2003 |
| JP | 2004-059382 | 2/2004 |
| JP | 2004-059383 | 2/2004 |
| JP | 2004-059384 | 2/2004 |

OTHER PUBLICATIONS

French Search Report, for Application No. 0500573, dated Jan. 11, 2006.
British Search Report, dated Jun. 13, 2005, for Application No. GB 0500645.7.

* cited by examiner

*Primary Examiner*—C. Melissa Koslow
(74) *Attorney, Agent, or Firm*—Antonelli, Terry, Stout & Kraus, LLP.

(57) ABSTRACT

The present invention provides an inorganic scintillator including a matrix material comprising a metal oxide, and a luminescence center made of Ce contained in the matrix material, the inorganic scintillator being adapted to scintillate in response to a radiation; wherein the matrix material further comprises a dopant having a tetravalent ionization energy I [kJ·mol$^{-1}$] satisfying the condition represented by the following expression (1):

$$3000 \leq I \leq 3500. \quad (1)$$

1 Claim, 1 Drawing Sheet

INORGANIC SCINTILLATOR

BACKGROUND OF THE INVENTION

1. Field of the Invention

The present invention relates to an inorganic scintillator.

2. Related Background Art

In the positron emission computed tomography (hereinafter referred to as "PET"), optical characteristics (wavelength conversion characteristics, etc.) of scintillators employed therein greatly influence imaging performances of the whole system, whereby an improvement in the optical characteristics of scintillators is one of the most important points in ameliorating the imaging performances of the whole system. Therefore, searches for scintillator materials which can construct scintillators having excellent optical characteristics, and developments for manufacturing techniques such as crystal growing techniques for putting these scintillators into practical use have vigorously been under way. In the field of high-energy physics, on the other hand, there have been demands for practically using scintillators which can efficiently detect a minute amount of high-energy particles in order to detect those flying from the space to the earth and using them in experiments for analysis or the like.

As scintillators employed in the PET, those with a high fluorescence output, those with a short fluorescence decay time, those with a high energy resolution, etc. have been in demand. In particular, from the viewpoint of alleviating the burden on a sample to be inspected by using the PET, it is necessary to shorten the inspection time per sample, which requires scintillators with a short fluorescence decay time.

Known as examples of scintillators aimed at shortening the fluorescence decay time are inorganic scintillators configured such that cerium is included as a luminescence center in a matrix material made of a mixed metal oxide containing lanthanoid (see, for example, Japanese Patent Publication No. SHO 62-8472). Examples of these inorganic scintillators include those having a chemical composition represented by the general formula of $Ce_\alpha Ln_{2-\alpha}SiO_5$ or the general formula of $Ce_\beta Ln_{2-\beta}AlO_3$. Here, $0<\alpha<0.1$; $0<\beta<0.1$; and Ln is Sc, Y, La, Gd, or Lu.

SUMMARY OF THE INVENTION

However, conventional scintillators using cerium as the luminescence center such as the scintillator disclosed in Patent Document 1 mentioned above have been problematic in that their luminous efficiency decreases when the content of cerium to become the luminescence center (amount of substitution for metal elements constituting the matrix material) is increased in order to shorten the fluorescence decay time.

For example, among scintillators having a chemical composition represented by the general formula of $Ce_\alpha Ln_{2-\alpha}SiO_5$, those made of cerium-doped gadolinium silicate ($Ce_\alpha Gd_{2-\alpha}SiO_5$) have been problematic in that the luminous efficiency decreases as the amount of cerium substituting gadolinium increases in order to shorten the fluorescence decay time.

In view of the problem mentioned above, it is an object of the present invention to provide an inorganic scintillator which can shorten the fluorescence decay time easily and reliably while being able to attain a sufficient luminous efficiency.

The inventors conducted diligent studies and, as a result, have found that the occurrence of a change in valence from the trivalent to tetravalent state of cerium to become the luminescence center contained in the matrix material greatly affects the problem of luminous efficiency decreasing in the case where the cerium content is increased in order to shorten the fluorescence decay time.

Cerium to become the luminescence center is an element which tends to change its valence from the trivalent state (contributing to luminescence as the luminescence center) to the tetravalent state (not contributing to luminescence). In particular, cerium in the tetravalent state does not contribute to luminescence, but has a property of absorbing the light emitted by cerium in the trivalent state. When the cerium content in the matrix material is increased, the content of cerium in the tetravalent state also increases. The inventors have found that the above is one of major reasons why the luminous efficiency decreases.

When the amount of cerium substituting for gadolinium is increased in a scintillator made of cerium-doped gadolinium silicate in particular, the scintillator is tinted lemon yellow, whereby the luminous efficiency decreases. The inventors have found that an increase in cerium in the tetravalent state in the matrix material is one of major reasons therefor.

The inventors further conducted studies and, as a result, have found the valence change of cerium from the trivalent to tetravalent state can fully be prevented from occurring in a scintillator containing cerium as its luminescence center by adding thereto a dopant having a specific tetravalent ionization energy, so that the above-mentioned object is achievable, thus attaining the present invention.

Namely, the present invention provides an inorganic scintillator including a matrix material comprising a metal oxide, and a luminescence center made of Ce contained in the matrix material, the inorganic scintillator being adapted to scintillate in response to a radiation; wherein the matrix material further comprises a dopant having a tetravalent ionization energy I [kJ·mol$^{-1}$] satisfying the condition represented by the following expression (1):

$$3000 \leq I \leq 3500 \quad (1)$$

Since the matrix material contains a dopant having a tetravalent ionization energy satisfying the condition represented by expression (1) in addition to the luminescence center made of Ce, the scintillator in accordance with the present invention can fully reduce the change of cerium in the matrix material from the trivalent to tetravalent state and sufficiently keep the trivalent state. This can shorten the fluorescence decay time easily and reliably, and yield a sufficient luminous efficiency.

In the present invention, the "tetravalent ionization energy I [kJ·mol$^{-1}$]" refers to energy (quaternary ionization energy) per 1 mol of $M^{3+}$ for advancing the reaction represented by $M^{3+} \rightarrow M^{4+} + e^-$, where M is the symbol of the element to become the dopant.

Though no detailed mechanisms which make it possible to yield the effects of the present invention mentioned above by the matrix material containing the dopant having a tetravalent ionization energy satisfying the condition represented by expression (1) in addition to the luminescence center (cerium) have been elucidated yet, the inventors infer as follows.

Since cerium has a tetravalent ionization energy I of 3547 kJ·mol$^{-1}$, the dopant having the tetravalent ionization energy satisfying the condition represented by expression (1) seems to be more likely to attain the tetravalent state than is cerium. The inventors infer that this fully restrains cerium from changing from the trivalent to tetravalent state in the matrix material. The inventors consider that cerium thus held in the trivalent state in the matrix material makes it possible to yield a sufficient luminous efficiency.

The present invention can provide an inorganic scintillator which can shorten the fluorescence decay time easily and reliably while being able to attain a sufficient luminous efficiency.

DESCRIPTION OF THE PREFERRED EMBODIMENTS

Figure 1:
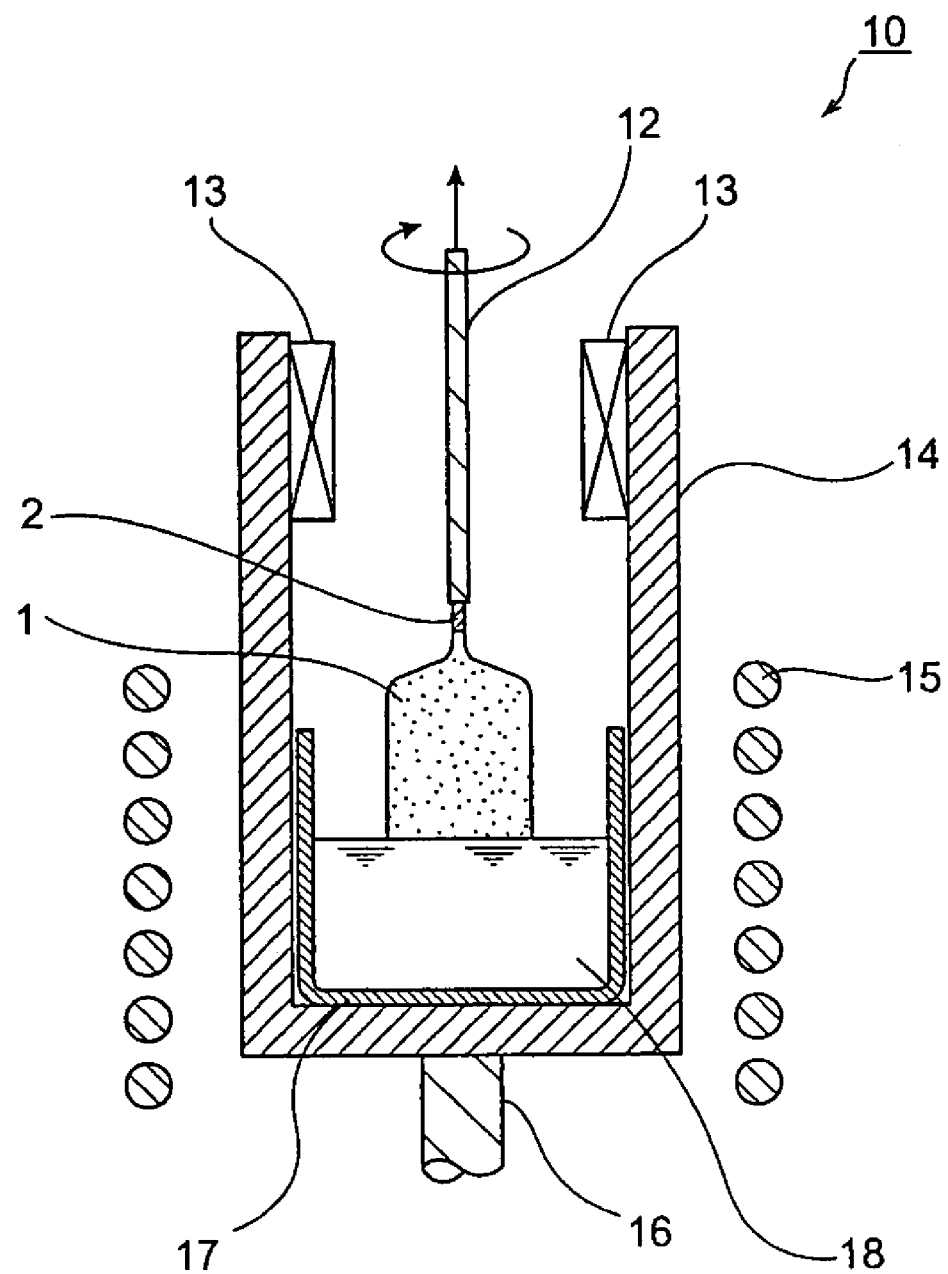
FIG. 1 is a schematic sectional view showing an example of basic configuration of a manufacturing apparatus for manufacturing the inorganic scintillator of the present invention.

In the following, the inorganic scintillator of the present invention will be explained in detail.

As mentioned above, the inorganic scintillator of the present invention is an inorganic scintillator including a matrix material comprising a metal oxide, and a luminescence center made of Ce contained in the matrix material, while being adapted to scintillate in response to a radiation. The matrix material further comprises a dopant having a tetravalent ionization energy I [kJ·mol$^{-1}$] satisfying the condition represented by the following expression (1):

$$3000 \leq I \leq 3500 \tag{1}$$

Since the matrix material contains a dopant having a tetravalent ionization energy satisfying the condition represented by expression (1) in addition to the luminescence center made of Ce, the scintillator in accordance with the present invention can fully reduce the change of cerium in the matrix material from the trivalent to tetravalent state and sufficiently keep the trivalent state. This can shorten the fluorescence decay time easily and reliably, and yield a sufficient luminous efficiency.

When a dopant having a tetravalent ionization energy I of less than 3000 kJ·mol$^{-1}$ [e.g., thorium (tetravalent ionization energy I=2780 kJ·mol$^{-1}$)] is contained, the resulting inorganic scintillator emits light not only in response to a radiation from the outside but also in response to a radiation from itself, since the dopant of this type contains a large amount of isotopes, so that noise occurs, whereby the scintillator fails to exhibit its functions.

When a dopant having a tetravalent ionization energy I exceeding 3500 kJ·mol$^{-1}$ [e.g., Nb (tetravalent ionization energy I=3700 kJ·mol$^{-1}$)] is contained, the resulting inorganic scintillator fails to achieve the effects of the present invention mentioned above, since the dopant of this type is less likely to attain the tetravalent state than is Ce and thus cannot fully suppress the change of Ce from the trivalent to tetravalent state.

In view of the foregoing, Hf is preferred as the dopant having a tetravalent ionization energy satisfying the condition represented by expression (1).

The inorganic scintillator of the present invention is not restricted in particular in terms of its solid internal structure as long as it is a solid adapted to scintillate in response to a radiation. For example, it may take any of 1) single-crystal state, 2) polycrystal state, 3) amorphous state, and 4) quasicrystal state or a state in which two or more states of 1) to 4) are mixed. From the viewpoint of more reliably attaining an excellent scintillation characteristic, it will be preferred if the inorganic scintillator of the present invention is a single crystal.

In the present invention, "radiation" refers to a corpuscular beam (α-ray, β-ray, γ-ray, X-ray, or the like) having an amount of energy sufficient for ionizing an atom or molecule. In the present invention, "elements belonging to rare-earth elements" refer to Sc, Y, La, Ce, Pr, Nd, Gd, Tb, Ho, Er, Tm, Lu, Sm, Eu, Dy, Pm, and Yb in group III elements.

From the viewpoint of more reliably attaining the effects of the present invention, it will be preferred if the dopant content n1 [mol] and the content n2 [mol] of the luminescence center (Ce) satisfy the condition represented by the following expression (2):

$$0.0001 \leq (n1/n2) \leq 0.1 \tag{2}$$

When the value of (n1/n2) is less than 0.0001, it tends to be more difficult to fully suppress the change of cerium in the matrix material from the trivalent to tetravalent state.

When the value of (n1/n2) exceeds 0.1, defects such as voids are likely to occur in a grown crystal ingot, thereby deteriorating scintillator performances.

From the viewpoint of yielding the effects of the present invention more easily and more reliably, it will be preferred in the inorganic scintillator of the present invention if the matrix material has a chemical composition represented by the following general formula (3) and simultaneously satisfies the conditions represented by the following expressions (4) to (6):

$$Ln_{2x}Si_yO_{(3x+2y)} \tag{3}$$

$$0.9 \leq x \leq 1.1 \tag{4}$$

$$0.9 \leq y \leq 2.1 \tag{5}$$

$$4.5 \leq (3x+2y) \leq 7.5 \tag{6}$$

In expressions (3) to (6), Ln is at least one species of element selected from the group consisting of elements belonging to rare-earth elements, and x and y are values each simultaneously satisfying the conditions represented by expressions (3) to (6).

When the conditions of expressions (3) to (6) are satisfied, it will be preferred in the inorganic scintillator of the present invention if the matrix material has a chemical composition represented by the following formula (7). The inorganic scintillator using a matrix material having such a chemical composition can attain the effects of the present invention more easily.

$$Gd_2SiO_5 \tag{7}$$

An example of method of manufacturing the inorganic scintillator of the present invention (an example of manufacturing method for yielding a rare-earth silicate single crystal) will now be explained.

For yielding a rare-earth silicate single crystal as an inorganic scintillator, its manufacturing method includes a melting step of obtaining a melt liquid in which a material is in a melt state according to a melting method; a cooling/solidifying step of yielding a single-crystal ingot of the inorganic scintillator by cooling and solidifying the melt liquid; and a cutting step of cutting the single-crystal ingot obtained by way of the cooling/solidifying step into a desirable form and size.

From the viewpoint of more reliably yielding the inorganic scintillator of the present invention, it will be preferred if the melting method in the melting step is the Czochralski method. Preferably, in this case, operations in the melting step and cooling/solidifying step are carried out by using a lifting apparatus 10 configured as shown in FIG. 1.

FIG. 1 is a schematic sectional view showing an example of basic configuration of a manufacturing apparatus for manufacturing the inorganic scintillator of the present invention.

The lifting apparatus 10 shown in FIG. 1 includes a high-frequency induction heating furnace (2-zone heating growth furnace) 14. The high-frequency induction heating furnace 14 is used for continuously performing operations in the above-mentioned melting step and cooling/solidifying step.

The high-frequency induction heating furnace 14 is a bottomed refractory vessel with a cylindrical side wall, and has the same shape as with known bottomed vessels employed for manufacturing a single crystal according to the Czochralski method. A high-frequency induction coil 15 is wound about the side wall in the bottom part of the high-frequency induction heating furnace 14. A crucible 17 (e.g., a crucible made of Ir) is disposed on the bottom face within the high-frequency induction heating furnace 14. The crucible 17 also acts as a high-frequency induction heater. Materials for the inorganic scintillator are put into the crucible 17, and a high frequency is induced in the high-frequency induction coil 15, so as to heat the crucible 17, whereby a melt liquid 18 (melt) made of constituent materials of the inorganic scintillator is obtained.

A heater 13 (resistance heater) is disposed on the inner wall face of the upper part of the high-frequency induction heating furnace 14, which is not in contact with the melt liquid 18. The heat output of the heater can be controlled independently of the high-frequency induction coil 15.

At the center of the bottom of the high-frequency induction heating furnace 14, an opening (not shown) is formed so as to penetrate through the high-frequency induction heating furnace 14 from the inside to the outside. A crucible support shaft 16 is inserted through this opening from the outside of the high-frequency induction heating furnace 14, whereas the leading end of the crucible support 16 is connected to the bottom of the crucible 17. Rotating the crucible support shaft 16 can rotate the crucible 17 in the high-frequency induction heating furnace 14. A gap between the opening and the crucible support 16 is sealed with packing or the like.

A more specific manufacturing method using the lifting apparatus 10 will now be explained.

First, in the melting step, materials for the single crystal of the inorganic scintillator are put into the crucible 17, and a high frequency is induced in the high-frequency induction coil 15, so as to yield a melt liquid 18 (melt) made of the constituent materials of the inorganic scintillator.

Subsequently, the melt liquid is cooled and solidified in the cooling/solidifying step, so as to yield a cylindrical single-crystal ingot 1 of the inorganic scintillator. More specifically, operations proceed in two steps, i.e., a growing step and a cooling step, as will be explained in the following.

First, in the growing step, a lifting rod 12 having a seed crystal 2 secured to its lower end is introduced into the melt liquid 18 from the top of the high-frequency induction heating furnace 14, and then the single-crystal ingot 1 of the inorganic scintillator is formed while the lifting rod 12 is raised. In the growing step, the heat output of the heater 13 is regulated so as to grow the single-crystal ingot 1 of the inorganic scintillator raised from the melt liquid 18 until the ingot attains a predetermined diameter.

Next, in the cooling step, the heat output of the heater is regulated so as to cool the grown single-crystal ingot (not shown) obtained after the growing step.

Here, from the viewpoint of sufficiently preventing the single crystal from cracking, and more reliably manufacturing the single crystal of the inorganic scintillator satisfying the condition represented by the expression (1), it will be preferred if the gas phase within the high-frequency induction heating furnace 14 during the operations of the melting step and cooling/solidifying step is filled with a mixed gas mainly composed of an inert gas satisfying the condition represented by the following expression (8):

$$0\% \leq 100 \times [G/(E+G)] \leq 2.0\% \qquad (8)$$

In expression (8), E is the partial pressure of the inert gas in the mixed gas, and G is the partial pressure of the oxygen gas in the mixed gas. In the present invention, the "inert gas" refers to rare gases and nitrogen gas.

When the value of $[G/(E+G)]$ is 0%, microcracks are more likely to be generated in the single crystal 1 by thermal etching. When the value of $[G/(E+G)]$ exceeds 2.0%, on the other hand, the crystal is more likely to be tinted, so as to lower scintillator performances. When the value of $[G/(E+G)]$ exceeds 4.0% in the case where Ir is used as a constituent material of the crucible, the constituent material evaporates vigorously, thereby making it harder to grow the crystal.

Next, in the cutting step, the single-crystal ingot 1 of the inorganic scintillator is cut into a desirable form and size, so as to yield the single crystal of the inorganic scintillator.

Though a preferred embodiment of the present invention is explained in the foregoing, the present invention is not restricted thereto.

EXAMPLE

In the following, a preferred example of the present invention will be explained in further detail, which does not restrict the present invention.

Example 1

As materials, 20489.1 g of gadolinium oxide ($Gd_2O_3$ with a purity of 99.99 mass %), 3413.1 g of silicon dioxide ($SiO_2$ with a purity of 99.99 mass %), 97.8 g of cerium oxide ($CeO_2$ with a purity of 99.99 mass %), and 2.4 g of hafnium oxide ($HfO_2$ with a purity of 99.99 mass %) were put into an Ir crucible having a diameter of 180 mm, a height of 180 mm, and a thickness of 3 mm, whereby 24002.4 g of their mixture were obtained. The mixture was subsequently heated in a high-frequency induction heating furnace to a temperature of 1950° C. or higher so as to be melted, whereby a melt liquid was obtained.

Next, the tip of a lifting rod having a seed crystal secured to its lower end was introduced into the melt liquid, so as to perform seeding. Subsequently, a single-crystal ingot having a neck diameter of 8 mm was raised at a lifting rate of 1 to 3 mm/h, so as to form a neck part. Then, a cone part (cylindrical part) was raised. Here, the raising of the cylindrical part was started from the point where its diameter became 105 mm. After the cylindrical part was grown, the single-crystal ingot was cut off from the melt liquid, and cooling was started.

After the cooling was completed, the resulting single crystal was taken out. In thus obtained single-crystal ingot, the crystal had a mass of about 19.1 kg, the cone part had a length of about 80 mm, and the cylindrical part had a length of about 202 mm and a diameter of about 120 mm.

Next, using an inductively coupled plasma (hereinafter referred to as ICP) mass spectrometer (product name:

SPQ9000 manufactured by Seiko Instruments Inc.), the cerium content and hafnium content in thus obtained crystal were determined.

As a result of the analysis, the ratio (n1/n2) between the content n1 [mol] of the dopant (Hf) and the content n2 [mol] of the luminescence center (Ce). was about 0.0016 in the upper part of crystal and about 0.0018 in the lower part of crystal.

The ratio (n2/n3) between the content n2 [mol] of the luminescence center (Ce) and the content n3 [mol] of gadolinium was about 0.35 in the upper part of crystal and about 0.6 in the lower part of crystal.

The ratio (n1/n3) between the content n1 [mol] of the dopant (Hf) and the content n3 [mol] of gadolinium was about 5.6 ppm in the upper part of crystal and about 11 ppm in the lower part of crystal.

Using an inner perimeter knife cutter, the single-crystal ingot was cut into round slices at intervals of 20 mm. The blade used in the inner perimeter knife cutter was one electrodeposited with natural diamond of #325 to #400. After being cut into the round slices, the resulting single crystal was cut with a multiple band saw at pitches of 6 mm in a direction perpendicular to the round cross section, and then at pitches of 4 mm in a direction perpendicular to thus obtained cross sections, whereby 10 samples (of the single crystal of inorganic scintillator) each having a substantially rectangular parallelepiped form with a size of 4 mm×6 mm×20 mm were cut out from each of the upper and lower ends of the crystal.

The fluorescence output and energy resolution were determined in thus obtained 20 samples of inorganic scintillator by the following method.

The five out of six surfaces of each sample (having a substantially rectangular parallelepiped form) excluding the one having a size of 4 mm×6 mm (hereinafter referred to as "radiation entrance surface") were coated with a polytetrafluoroethylene (PTFE) tape as a reflecting material. Subsequently, the radiation entrance surface not covered with the PTFE tape in each sample was secured to the photomultiplier surface (photoelectric conversion surface) of a photomultiplier R878 manufactured by Hamamatsu Photonics K.K. with optical grease. Then, each sample was irradiated with a gamma ray at 611 keV using $^{137}$Cs, the energy spectrum of each sample was determined, and the fluorescence output and energy resolution of each sample were evaluated. Table 1 shows results. As the fluorescence output is greater, scintillator performances of the sample can be considered better. As the energy resolution value is smaller, scintillator performances of the sample can be considered better.

TABLE 1

| Part to extract sample from single-crystal ingot | Sample No. | Fluorescence output (Relative value) | Energy resolution (%) |
|---|---|---|---|
| Example 1 Upper end of crystal | 1 | 390.28 | 9.47 |
| | 2 | 412.80 | 7.16 |
| | 3 | 390.00 | 9.57 |
| | 4 | 427.87 | 7.55 |
| | 5 | 406.52 | 8.88 |
| | 6 | 417.88 | 8.58 |
| | 7 | 400.83 | 8.83 |
| | 8 | 409.36 | 8.47 |
| | 9 | 429.96 | 8.92 |
| | 10 | 411.82 | 8.81 |
| | Average | 409.73 | 8.62 |
| Example 2 Lower end | 1 | 414.32 | 8.07 |

TABLE 1-continued

| Part to extract sample from single-crystal ingot | Sample No. | Fluorescence output (Relative value) | Energy resolution (%) |
|---|---|---|---|
| of crystal | 2 | 390.02 | 8.21 |
| | 3 | 412.64 | 9.04 |
| | 4 | 396.75 | 8.63 |
| | 5 | 385.62 | 8.84 |
| | 6 | 392.82 | 8.40 |
| | 7 | 395.41 | 8.79 |
| | 8 | 396.44 | 8.96 |
| | 9 | 383.92 | 8.78 |
| | 10 | 406.10 | 10.08 |
| | Average | 397.40 | 8.78 |

Comparative Example 1

First, a melt liquid was obtained in the same procedure under the same condition as in Example 1 except that hafnium oxide was not put into the crucible. Subsequently, seeding was carried out in the same procedure under the same condition as in Example 1. Then, the single-crystal ingot having a neck diameter of 8 mm was raised at a lifting rate of 1 to 3 mm/h, so as to form a neck part. Thereafter, a cone part (cylindrical part) was raised. Here, the raising of the cylindrical part was started from the point where its diameter became 105 mm. After the cylindrical part was grown, the single-crystal ingot was cut off from the melt liquid, and cooling was started.

After the cooling was completed, the resulting single crystal was taken out. In thus obtained single-crystal ingot, the crystal had a mass of about 19.0 kg, the cone part had a length of about 80 mm, and the cylindrical part had a length of about 198 mm and a diameter of about 120 mm.

Next, using an ICP mass spectrometer (product name: SPQ9000 manufactured by Seiko Instruments Inc.), the cerium content and hafnium content in thus obtained crystal were determined.

As a result of the analysis, the ratio (n2/n3) between the content n2 [mol] of the luminescence center (Ce) and the content n3 [mol] of gadolinium was about 0.35 in the upper part of crystal and about 0.6 in the lower part of crystal. The ratio (n1/n3) between the content n1 [mol] of Hf and the content n3 [mol] of gadolinium was less than the detection limit (less than 1 ppm).

Using an inner perimeter knife cutter, the single-crystal ingot was cut into round slices at intervals of 20 mm. The blade used in the inner perimeter knife cutter was one electrodeposited with natural diamond of #325 to #400. After being cut into the round slices, the resulting single crystal was cut with a multiple band saw at pitches of 6 mm in a direction perpendicular to the round cross section, and then at pitches of 4 mm in a direction perpendicular to thus obtained cross sections, whereby 10 samples (of the single crystal of inorganic scintillator) each having a substantially rectangular parallelepiped form with a size of 4 mm×6 mm×20 mm were cut out from each of the upper and lower ends of the crystal.

The fluorescence output and energy resolution were determined in thus obtained 20 samples of inorganic scintillator by the following method.

The five out of six surfaces of each sample (having a substantially rectangular parallelepiped form) excluding the one having a size of 4 mm×6 mm (hereinafter referred to as "radiation entrance surface") were coated with a polytetrafluoroethylene (PTFE) tape as a reflecting material. Subsequently, the radiation entrance surface not covered with the PTFE tape in each sample was secured to the photomultiplier surface (photoelectric conversion surface) of a photomultiplier R878 manufactured by Hamamatsu Photonics K.K. with optical grease. Then, each sample was irradiated with a gamma ray at 611 keV using $^{137}$Cs, the energy spectrum of each sample was determined, and the fluorescence output and energy resolution of each sample were evaluated. Table 2 shows results.

TABLE 2

| Part to extract sample from single-crystal ingot | | Sample No. | Fluorescence output (Relative value) | Energy resolution (%) |
|---|---|---|---|---|
| Example 1 | Upper end of crystal | 1 | 340.68 | 8.74 |
| | | 2 | 356.23 | 8.86 |
| | | 3 | 343.97 | 10.69 |
| | | 4 | 346.63 | 9.36 |
| | | 5 | 346.31 | 8.63 |
| | | 6 | 343.99 | 8.55 |
| | | 7 | 377.05 | 8.85 |
| | | 8 | 390.59 | 9.63 |
| | | 9 | 351.63 | 9.76 |
| | | 10 | 342.00 | 10.05 |
| | | Average | 353.91 | 9.31 |
| Example 2 | Lower end of crystal | 1 | 381.35 | 9.17 |
| | | 2 | 357.87 | 9.64 |
| | | 3 | 352.51 | 9.69 |
| | | 4 | 345.06 | 9.62 |
| | | 5 | 338.81 | 9.87 |
| | | 6 | 397.20 | 9.75 |
| | | 7 | 409.14 | 10.13 |
| | | 8 | 342.63 | 8.71 |
| | | 9 | 347.98 | 8.85 |
| | | 10 | 359.79 | 9.88 |
| | | Average | 363.23 | 9.53 |

The results shown in Tables 1 and 2 have verified that the inorganic scintillator of Example 1 in which the matrix material further comprises hafnium as a dopant in addition to cerium acting as the luminescence center yields a greater fluorescence output value and a smaller energy resolution value as compared with the inorganic scintillator of Comparative Example 1. Namely, it has been seen that, as compared with the inorganic scintillator of Comparative Example 1, the inorganic scintillator of Example 1 yields excellent scintillator performances and can shorten the fluorescence decay time easily and reliably, while being able to attain a sufficient luminous efficiency.

The inorganic scintillator of the present invention can be utilized as a scintillator employed in the PET and a scintillator for studying high-energy physics.

What is claimed is:

1. An inorganic scintillator including a matrix material comprising a metal oxide, and a luminescence center made of Ce contained in the matrix material, the inorganic scintillator being adapted to scintillate in response to a radiation;

wherein the matrix material further comprises a dopant having a tetravalent ionization energy I [kJ·mol$^{-1}$] satisfying the condition represented by the following expression (1):

$$3000 \leq I \leq 3500 \qquad (1);$$

wherein the dopant content n1 [mol] and the content n2 [mol] of the luminescence center (Ce) satisfy the condition represented by the following expression (2):

$$0.0001 \leq (n1/n2) \leq 0.1 \qquad (2);$$

wherein the scintillator is a single crystal;

wherein the dopant is Hf;

wherein the matrix material has a chemical composition represented by the following general formula (3) and simultaneously satisfies the conditions represented by the following expressions (4) to (6):

$$Ln_{2x}Si_yO_{(3x+2y)} \qquad (3)$$

$$0.9 \leq x \leq 1.1 \qquad (4)$$

$$0.9 \leq y \leq 2.1 \qquad (5)$$

$$4.5 \leq (3x+2y) \leq 7.5 \qquad (6)$$

where Ln is at least one species of element selected from the group consisting of elements belonging to rare-earth elements, and x and y are values each simultaneously satisfying the conditions represented by expressions (3) to (6); and wherein the matrix material has a chemical composition represented by the following formula (7):

$$Gd_2SiO_5 \qquad (7).$$

* * * * *